May 19, 1953  G. C. DAVIDSON  2,638,730
WATER SPRAYING AND DEBRIS MOVING DEVICE
Filed Aug. 29, 1950
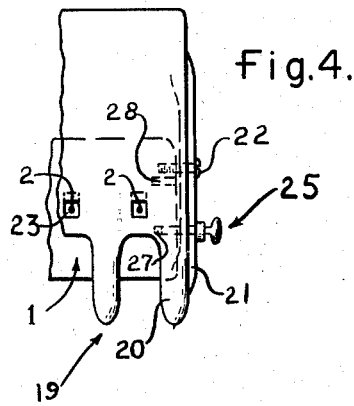
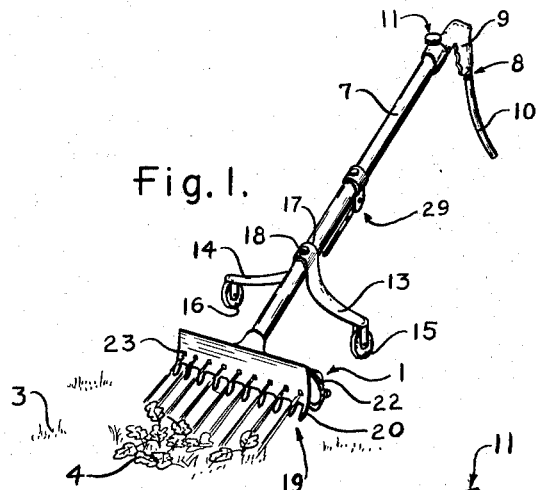
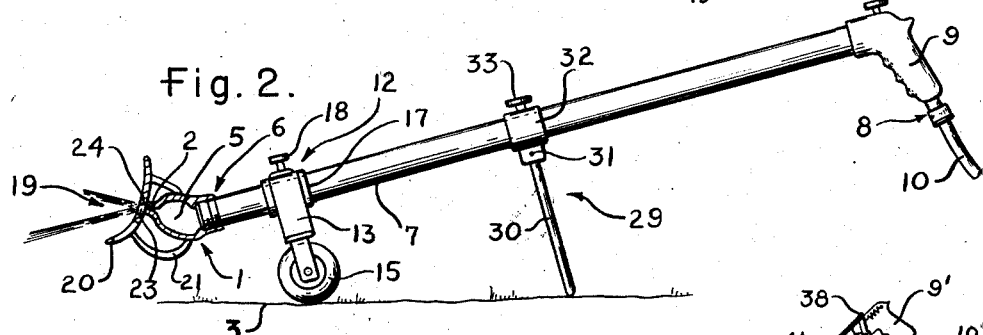
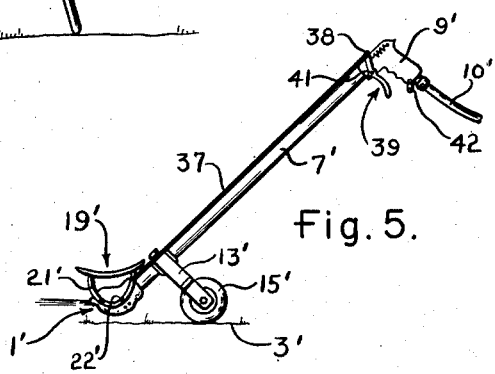
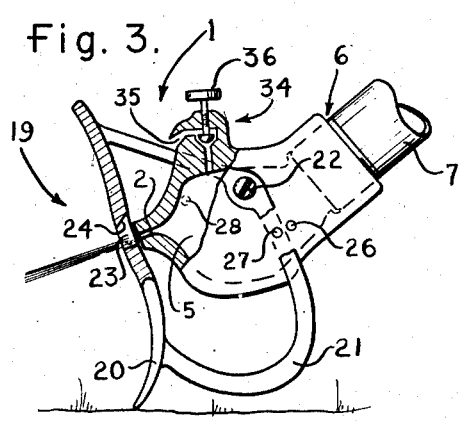
INVENTOR
Guy C. Davidson
BY R. W. Hodgson Patented May 19, 1953

2,638,730

UNITED STATES PATENT OFFICE 2,638,730

WATER SPRAYING AND DEBRIS MOVING DEVICE

Guy C. Davidson, Burbank, Calif.

Application August 29, 1950, Serial No. 182,000

5 Claims. (Cl. 56—400.14)

Generally speaking, the present invention relates to a combination sprinkling type irrigator and debris moving device. More particularly, it relates to a movable device provided with means for directing a spray, or plurality of sprays, of water in a direction having a component virtually parallel to a flat supporting surface along which the entire device is adapted to be manually moved. It will be understood that such a spray, or plurality of sprays of water will very effectively move any relatively light debris carried by the supporting surface, such as leaves, grass clippings, clippings from various types of vegetation, pine needles, and the like, which ordinarily are very difficult to clean up, particularly in the case of a supporting surface such as grass turf or the like.

Generally speaking, the present invention comprises a water spraying device which can be used either for irrigating purposes or for debris moving purposes (or both). It generally includes water spraying means (preferably, though not necessarily in the form of a virtually horizontal spraying head provided with a plurality of nozzles arranged in virtually horizontally spaced, similarly laterally directed positions) so directed with respect to an underlying supporting surface (such as a grass turf, sidewalk or the like) as to have a directional component virtually parallel to said supporting surface, whereby debris on said supporting surface (or partially intermingled therewith) will be moved therealong effectively.

Means is also provided for placing the water spraying means in effective, controllable, positionally movable communication with a source of pressurized water. In one preferred general form of the present invention, this comprises a longitudinal hollow handle, one end of which is effectively connected to the water spraying means (or head) and the other end of which is provided with suitable means such as a conduit, hose or the like for effectively connecting same with respect to a suitable source of pressurized water. Also preferably, though not necessarily, in said preferred form of the present invention, manually controllable valve means may be effectively placed in the flow path of the water through said hollow handle whereby the flow of water therethrough can be effectively controlled.

Also provided is carrying means arranged to carry the water spraying means (or head) in a selected water spraying position (usually with the plurality of nozzle means in horizontally spaced, virtually similarly directed positions so as to have a component virtually parallel to the underlying supporting surface. Said carrying means is preferably arranged for movement with respect to the supporting surface whereby the entire device can be selectively moved along the supporting surface for flushing and moving debris carried on said supporting surface in the direction of movement of the entire device. In one preferred form of the present invention, this may take the form of wheel means adapted to support the carrying means on the supporting surface.

In one preferred general form of the present invention, the carrying means may be provided with suitable sliding fastening and mounting means adapted to effectively, slidably connect the carrying means with respect to the hollow longitudinal handle whereby the carrying means can be slidably, longitudinally moved to any selected position with respect to the longitudinal handle means and selectively locked in said position.

In one preferred general form of the present invention, the upper end of the longitudinal handle means may be provided with manually cooperable means adapted to be manually grasped for use in effectively moving the entire device in any selected direction.

Also, in one preferred general form of the present invention, rake means (usually virtually horizontal) may be provided and adapted to be controllably movably positioned ahead of the carrying means for moving relatively large accumulations or piles of debris which have been previously gathered by the use of the water emitted by the nozzle means and which have become too large to be effectively moved by said water emitted by the nozzle means. In the form of the present invention wherein the rake means is controllably movably positioned with respect to the rest of the device, means may be provided to effectively selectively lock the movable rake in operative position or inoperative position, and if desired, means for moving it from one of said positions to the other and vice versa may be provided.

It will be understood from the above general description of the present invention that virtually all problems which have been encountered heretofore in removing debris along a virtually flat supporting surface and/or separating debris from intermingled relationship with respect to certain types of supporting surfaces, such as grass turf and the like, are completely eliminated. For example, grass clippings, leaves, pine needles and the like, which are thoroughly intermingled with the grass turf, can be very readily and simply separated therefrom and moved therealong to a selected point by the use of the present invention; the water spraying means acting to effectively move all of the debris from intermingled relationship with respect to the grass turf therealong until a considerable pile of such debris has accumulated, at which time the rake portion of the present invention can take over and move the relatively large pile along the surface of the turf to the edge thereof.

It should be clearly noted that it is not necessary for the rake to extend downwardly into intimate contact with the turf in this operation, since the water spray will do all of the debris moving operation which takes place actually within the grass turf, the rake acting only to move accumulated piles of debris over the grass turf. Thus, no tearing or damage to the grass turf will occur in the customary manner of prior art raking operations. Thus, virtually all debris intermingled with a surface, such as grass turf or the like, can be virtually completely separated and removed therefrom through the use of the present invention and with no damage whatsoever to the turf. This is a great step forward in the art.

Furthermore, the device of the present invention is well adapted for very rapidly cleaning and removing debris from relatively large flat surfaces, such as earth, macadam, sidewalk, and the like, in a very much more efficient manner than through the use of hand spraying methods employed heretofore.

Another advantage of the present invention is that it can also serve as a very effective sprinkler type irrigator adapted to effectively cover and irrigate a selected, virtually rectangular area or strip, which is usually fairly long and fairly narrow thus making a most effective type of irrigator for relatively long, thin strips of grass turf such as are frequently encountered in parking strips or the like. Furthermore, it is well adapted for irrigating large areas by sequentially irrigating such relatively long, thin rectangular areas.

With the above points in mind it is an object of the present invention to provide a novel water spraying and/or debris moving device capable of thorough effective cleansing of a supporting surface, such as grass turf, earth, sidewalk or the like, by effectively moving debris such as grass clippings, leaves, pine needles or the like, therealong (and in the case of grass turf and the like effectively separating such debris from intermingled relationship with respect to the grass turf and moving it therealong).

It is a further object of the present invention to provide a novel water spraying and/or debris moving device capable of thorough effective cleansing of a supporting surface, such as grass turf, earth, sidewalk or the like, by effectively moving debris such as grass clippings, leaves, pine needles or the like, therealong (and in the case of grass turf and the like effectively separating such debris from intermingled relationship with respect to the grass turf and moving it therealong); and to provide a rake positioned (either fixedly or controllably movably) ahead of the carrying means of the device for cooperation with a relatively large accumulated pile (or piles) of debris which has been accumulated by reason of the water spraying action of the device and which is too large to be effectively moved further by said water spraying action.

A further object of the present invention is to provide a novel water spraying and/or debris moving device capable of thorough effective cleansing of a supporting surface, such as grass turf, earth, sidewalk or the like, by effectively moving debris such as grass clippings, leaves, pine needles or the like, therealong (and in the case of grass turf and the like effectively separating such debris from intermingled relationship with respect to the grass turf and moving it therealong), the device being so arranged as to also be capable of use as a sprinkler type irrigator for irrigating a relatively thin, rectangular area (the length of which can be selected by adjustment of the device).

Other and allied objects will be apparent to those skilled in the art after a careful perusal, examination and study of the illustrations, specification and appended claims.

To facilitate understanding, reference will be made to the hereinbelow described drawings, in which:

Fig. 1 is a reduced, front, three-quarters perspective view of one illustrative embodiment of the present invention in operative position with respect to some debris carried by a grass turf.

Fig. 2 is an enlarged side elevation, partly in section, of the form of the present invention shown in Fig. 1 illustrating it, however, in sprinkling position with respect to a supporting surface which may be a grass turf or the like.

Fig. 3 illustrates in modified enlarged, fragmentary elevational form with parts in sections and parts broken away, the water spraying head of the form of the present invention shown in Figs. 1 and 2 and the rake means when the device is positioned in debris moving and flushing relationship with respect to a supporting surface.

Fig. 4 is a fragmentary, front elevational (partly broken away) of the rake and water spraying head shown in Fig. 3, as viewed from the left.

Fig. 5 is a reduced, diagrammatic, side elevation of a slightly modified form of the present invention showing an arrangement for moving the rake into and out of operative position with respect to the balance of the device. The rake is illustrated in inoperative position.

Generally speaking, the present invention includes water spraying means arranged for effective, controllable, positionally movable communication with a source of pressurized water, and carrying means arranged to carry the water spraying means in a selected water spraying position with respect to a supporting surface and for selective movement with respect thereto. In the specific example described and illustrated, the water spraying means takes the form of a longitudinal, virtually horizontal water spraying head, indicated generally at 1, provided with a plurality of virtually, horizontally spaced, laterally directed nozzle means 2 therein. It should be noted that the nozzle means 2 (which are preferably, though not necessarily, virtually parallel) have an appreciable length as best shown in Fig. 3 in order to properly direct the water emitted therefrom so that it will be downwardly, angularly inclined with respect to the supporting surface 3 (best shown in Fig. 3) and will have a directional component virtually parallel thereto so as to effectively move and separate debris, such as is indicated generally at 4 in Fig. 1, with respect to the supporting surface 3.

In the specific example described and illustrated the water spraying head 1 has a hollow, inner chamber 5 which is in communication with the nozzles 2 and which is also mechanically connected by threaded engaging means indicated generally at 6 to the lower end of a longitudinal hollow handle 7 which is in effective communication with the hollow interior 5 of the water spraying head 1. The other end of the hollow handle 7 is adapted to be effectively connected to a suitable source of water under pressure. In the specific example described and illustrated, a suitable fitting, generally indicated at 8 is adapted to effectively connect a curved, manually grippable portion 9 of the hollow member 7 with respect to a flexible hose or conduit 10, which is adapted to be connected to a suitable source of pressurized water. In the specific example illustrated, manually operable valve means 11 is also positioned so as to effectively open or close the hollow handle 7 in order to control the flow of pressurized water therethrough to the water spraying head 1 and the nozzles 2. Also generally speaking, suitable carrying means is provided for effectively carrying the water spraying means for selective movement with respect to the supporting surface. In the specific example described and illustrated, the carrying means is indicated generally at 12 and includes opposed lateral arms 13 and 14 carrying at the ends thereof suitable wheel means 15 and 16. In the specific example described and illustrated, the carrying means is slidably, selectively, lockably carried on the exterior of the hollow handle 7 by means of a hollow, cylindrical member 17 provided with a manually actuatable set screw 18 threadedly engaged therewith, which can be advanced so as to frictionally lock the entire device in any selected position along the hollow handle 7, and which can be threadedly retracted so as to become disengaged with respect to the longitudinal hollow handle 7, whereby the entire carriage 12 can be longitudinally, slidably moved to any selected position. This arrangement makes it possible to effectively raise or lower the position of the water spraying head 1 with respect to the supporting surface or turf 3 when the device is in operating, debris moving position shown in Figs. 1, 3 and 4 or is in the water sprinkling position shown in Fig. 2. This adjustment makes it possible to obtain optimum performance from the device under varied conditions.

Also generally speaking, in one form of the present invention, suitable rake means may be provided and controllably movably positioned ahead of the carrying means so as to be capable of cooperating with relatively large accumulated piles of debris, which have been accumulated as a result of the water spraying action of the nozzles and which have become too large to be further moved by said water emitted from said nozzle means. In the specific example described and illustrated in Figs. 1, 2, 3, and 4 the rake means (indicated generally at 19) is virtually horizontal and includes a plurality of normally downwardly projecting teeth 20 pivotally fastened by suitable yoke arm means 21 with respect to the ends of the water spraying head 1 (one such fastening means being indicated at 22). It should be noted that in the specific example illustrated the central portion of the rake is positioned immediately ahead of the nozzle means 2 and would ordinarily interfere with the jets of water emitted therefrom. In order to correct this, corresponding aperture means 23 which is provided with angularly, downwardly inclined upper edge means 24, as best shown is so arranged that when in the position shown in Fig. 3, the inclined edge means 24 is out of the path of travel of the jets emitted by the nozzle means 2 (this is the debris moving and flushing position), and when in the position shown in Fig. 2, the inclined edge means 24 is in the path of travel of the jets emitted by the nozzle means 2 and thereby angularly, downwardly deflects at least a portion of the water emitted from the jets 2 onto the supporting surface 3 (usually grass) a short distance ahead of the entire device (this would be toward the left as viewed in Fig. 2). The purpose of this arrangement, as shown in Fig. 2, is to provide an auxiliary supply of water in the near foreground immediately ahead of the sprinkling device, since normally too great a quantity of the sprayed water emitted by the nozzle means 2 would be sprayed a considerable distance and would water the most remote portion of a long, thin, rectangular area to a considerably greater extent than the near portions thereof. The arrangement shown in Fig. 3 is such that the aperture means 23 in the rake 19 do not in any way interfere with the sprays or jets of water emitted from the nozzle means 2 which are used in the flushing and debris moving operation best shown in Fig. 1. The two positions of the rake and a third inoperative position wherein it is backwardly swung over (or under) the hollow handle 7 completely out of operative position are arranged to be attained by merely rotating the yoke arm 21 around the pivotal fastening point 22 in a clockwise direction from that shown in Fig. 2 into the position shown in Fig. 3 (and/or into the above mentioned inoperative position) and vice versa. When in any of said positions, the rake yoke arm 21 is locked by means of a manually actuatable pin, indicated generally at 25, adapted to fit into any of the three corresponding recesses 26, 27 or 28 in the end of the water spraying head 1.

In the specific example described and illustrated, a suitable support means indicated generally at 29 is also provided and serves two primary purposes, one of which is to support the entire device in the sprinkling position shown in Fig. 2 and the other of which is to support the device when not in use. In the specific example described and illustrated, the support means 29 comprises an arm 30 pivotally mounted at 31 with respect to a sliding ring 32 slidably carried on the hollow handle 7. The ring 32 is provided with manually actuatable locking or set screw means 33 for effectively locking the entire device in a selected position with respect to the hollow longitudinal handle 7.

In the specific example illustrated in Fig. 3, an additional auxiliary sprayer head 34 is illustrated, as carried by the top of the water spraying means 1, and provided with forwardly and sharply downwardly angularly directed nozzle means 35 adapted to emit a fan shaped spray of water in a forward, downward direction, whereby the near foreground will be effectively sprayed. In this particular arrangement, manually controllable valve means may be provided such as indicated at 36. It should be noted that the auxiliary water spraying head 34 serves the same general purpose as the downwardly, angularly inclined slot or aperture means 23 in the rake 19 when it is in the position shown in Fig. 2— namely, to direct a certain selected portion of the water into the near foreground immediately ahead of the unit. This is primarily intended for use during the sprinkling operation rather than during the debris moving operation. It should be noted that either the aperture means 23 and/or the auxiliary head 34 may be employed in lieu of the other, or may be dispensed with entirely, if desired.

Fig. 5 illustrates a slightly modified form of the present invention wherein means is provided for effectively, controllably positioning the rake 19' in operative position or inoperative position (as shown) from a control position at the top or upper end of the handle. In the specific example illustrated, this takes the form of longitudinal link 37 one end of which is pivotally connected to rake 19' above the pivotal attachment point 22' of the rake 19' with respect to the water spraying head 1' and the other end of which is pivotally connected to the upper end 38 of a manual rake actuating lever indicated generally at 39 which is pivotally attached by means of a pin 41 on the hollow longitudinal tube 7'. It should be noted that the lower end of the rake actuating lever 39 is positioned a short distance ahead of the manually grippable handle portion 9' whereby the operator's fingers can easily extend around the lever 39 while he is gripping handle 9' for actuating the lever 39 (toward the right as viewed in Fig. 5) thus causing the rake 19' to move from the inoperative position shown in Fig. 5 into an operative position similar to that shown in Figs. 1, 2, 3 and 4. The device (rake 19' or lever 39) may be normally spring biased into the position shown in Fig. 5 to cause it to return to said position when the lever 39 is released, or various types of locking or multiposition control means may be employed to effectively position and/or lock the rake in any of the various positions.

In the specific example illustrated, a locking ring 42 is shown pivotally attached to the lower end of the manually grippable portion 9' in a position such that it can readily be swung into (and out of) engagement with the lower end of the lever 39 when said lever is manually moved toward the portion 9' to cause the rake 19' to swing into operative position. Thus the rake 19' will be held in operative position until the ring 42 is disengaged from the lever 39.

Numerous modifications and variations of the present invention will occur to those skilled in the art after a careful study hereof. All such properly within the spirit and teachings of the present invention are intended to be included and comprehended herein as fully as if specifically described and illustrated herein. For example, the exact configuration, structure, and relative positioning of the water spraying means and/or water spraying head and/or nozzle means may be modified substantially from that specifically described and illustrated herein. Means for emitting a relatively flat, thin sheet of water rather than a plurality of separate sprays of water may be employed, if desired. All of the sprays of water need not necessarily be virtually exactly parallel. Certain of them may have slightly different inclinations, such as being slightly toed in, for example, if desired.

It should be noted that the water spraying head can be of integral or non-integral construction, and the nozzle means can also be of integral or non-integral removable construction, if desired. This is also true of the rake means. The exact configuration and shape of the rake means and the means for mounting same may be such as to allow the rake to move from operative position to an inoperative position below the water spraying head and/or hollow tube rather than above them as illustrated herein. The rake mounting may be substantially modified, and if desired, the rake means may be fixedly rather than movably mounted with respect to the water spraying means, or in certain cases, the rake means may be eliminated entirely, if desired. The carrying means may be modified substantially, as may the handle means, the controllable valve means and the support means. It should also be noted that the support means may be eliminated entirely, if desired.

The exact composition, configuration, structure and relationship of the various component parts of the present invention are not critical and may be modified substantially within the teachings hereof. The embodiments of the present invention, as described and illustrated, are exemplary only and are not intended to limit the scope of the present invention which is to be interpreted in the light of the prior art and the appended claims only, with due consideration for the doctrine of equivalents.

I claim:

1. A water spraying and debris-moving device, comprising: a virtually horizontal water spraying head means provided with a plurality of virtually horizontally spaced, similar nozzle means extending laterally from one side of said longitudinal water spraying head means; means selectively cooperable for effectively, controllably communicating said water spraying head means with a source of pressurized water; water spraying head carrying means cooperable to selectively, movably carry said water spraying head means in debris-moving, flushing relationship with respect to an underlying supporting surface in a manner whereby water emitted from said plurality of horizontally spaced nozzle means will have components virtually parallel with respect to said supporting surface; manually cooperable handle means effectively connected to said water spraying head means and said water spraying head carrying means for moving said water spraying head and said water spraying head carrying means along said supporting surface and in flushing, debris-moving relationship with respect thereto; and virtually horizontal rake means provided with a plurality of virtually horizontally spaced, virtually downwardly directed rake teeth, said rake means being selectively controllably, horizontally pivotally mounted with respect to said water spraying head means for manually controllable pivotal movement into and out of a forward debris-moving position for cooperative debris-moving engagement with respect to large accumulations of debris on the supporting surface.

2. A water spraying and debris-moving device, comprising: a virtually horizontal water spraying head means provided with a plurality of virtually horizontally spaced, similar nozzle means extending laterally from one side of said longitudinal water spraying head means; hollow, longitudinal handle means, one end of which is effectively, mechanically connected with respect to said water spraying head means and in effective communication therewith, and the other end of which is cooperable for connection to a source of pressurized water; manually operable valve means effectively positioned in the flow path of the water through the hollow handle means to the water spraying head means, whereby the flow of water therethrough can be effectively controlled; carrying means cooperable for effective connection with respect to said longitudinal hollow handle means, said carrying means being provided with wheel means cooperable to make effective contact with an underlying supporting surface for movably supporting the carrying means, the hollow handle and the water spraying head in selected positions with respect to said supporting surface and for movement with respect thereto; and virtually horizontal rake means provided with a plurality of virtually horizontally spaced, virtually downwardly directed rake teeth, said rake means being controllably, horizontally pivotally mounted with respect to said water spraying head means for manually selectively controllable pivotal movement into and out of a forward debris-moving position for cooperative debris-moving engagement with respect to large accumulations of debris on the supporting surface.

3. A device of the character defined in claim 2, wherein selectively operable mounting and fastening means is provided for effective cooperation with the handle means and the carrying means to effectively, slidably mount the carrying means with respect to the hollow longitudinal handle means in a manner whereby the position of the entire carrying means can be slidably, longitudinally adjusted with respect to said longitudinal hollow handle means and locked in said selected position.

4. A device of the character defined in claim 3, wherein the water spraying head means is provided with auxiliary water spraying means cooperable therewith to emit a fan-shaped spray of water in a direction such as to have a greater downward component with respect to the supporting surface than the water emitted from the plurality of horizontally spaced nozzle means.

5. A water spraying and debris-moving device, comprising: a virtually horizontal water spraying head means provided with a plurality of virtually horizontally spaced, similar nozzle means extending laterally from one side of said longitudinal water spraying head means; means selectively cooperable for effectively, controllably communicating said water spraying head means with a source of pressurized water; water spraying head carrying means cooperable to selectively, movably carry said water spraying head means in debris-moving, flushing relationship with respect to an underlying supporting surface in a manner whereby water emitted from said plurality of horizontally spaced nozzle means will have components virtually parallel with respect to said supporting surface; manually cooperable handle means effectively connected to said water spraying head means and said water spraying head carrying means for moving said water spraying head and said water spraying head carrying means along said supporting surface and in flushing, debris-moving relationship with respect thereto; said carrying means being provided with wheel means cooperable to make effective contact with an underlying supporting surface for movably supporting the carrying means, the handle and the water spraying head in selected positions with respect to said supporting surface and for movement with respect thereto; selectively operable mounting and fastening means cooperable with the handle means and the carrying means to effectively, slidably mount the carrying means with respect to the hollow longitudinal handle means in a manner whereby the position of the entire carrying means can be slidably, longitudinally adjusted with respect to said longitudinal hollow handle means and locked in said selected position.

GUY C. DAVIDSON.

References Cited in the file of this patent

UNITED STATES PATENTS

| Number | Name | Date |
|---|---|---|
| 736,878 | Reis | Aug. 18, 1903 |
| 1,275,382 | Camp | Aug. 13, 1918 |
| 1,724,702 | Flickinger | Aug. 13, 1929 |
| 1,932,137 | Jinkerson | Oct. 24, 1933 |
| 2,144,890 | Nakaoka | Jan. 24, 1939 |
| 2,246,640 | Shurphay | June 24, 1941 |